March 17, 1959 F. E. BUSCHBOM 2,877,907
APPARATUS FOR UNLOADING SILOS
Filed Aug. 30, 1954 3 Sheets-Sheet 1
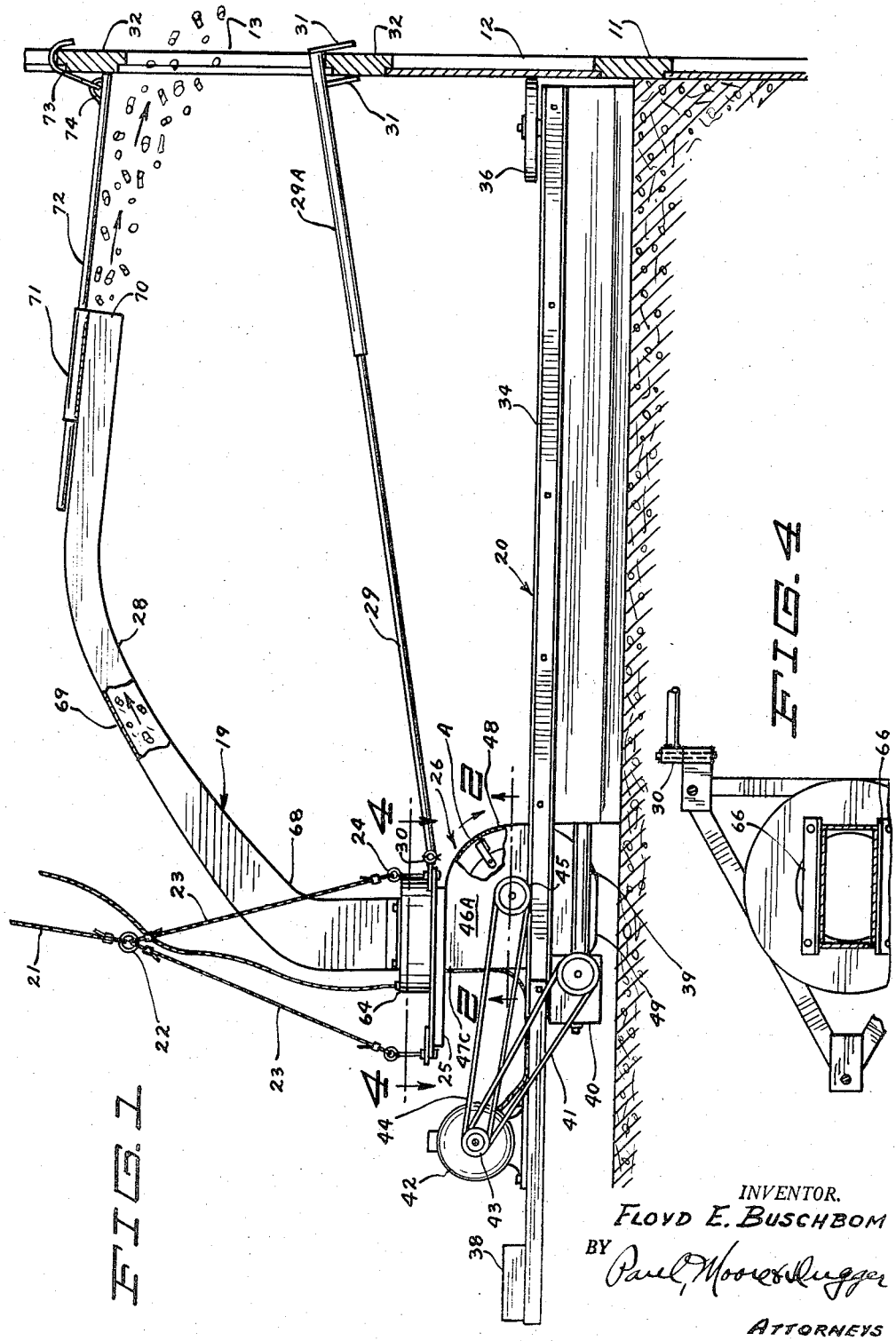
INVENTOR.
FLOYD E. BUSCHBOM
BY Paul, Moore & Dugger
ATTORNEYS March 17, 1959
F. E. BUSCHBOM
2,877,907
APPARATUS FOR UNLOADING SILOS
Filed Aug. 30, 1954
3 Sheets-Sheet 2
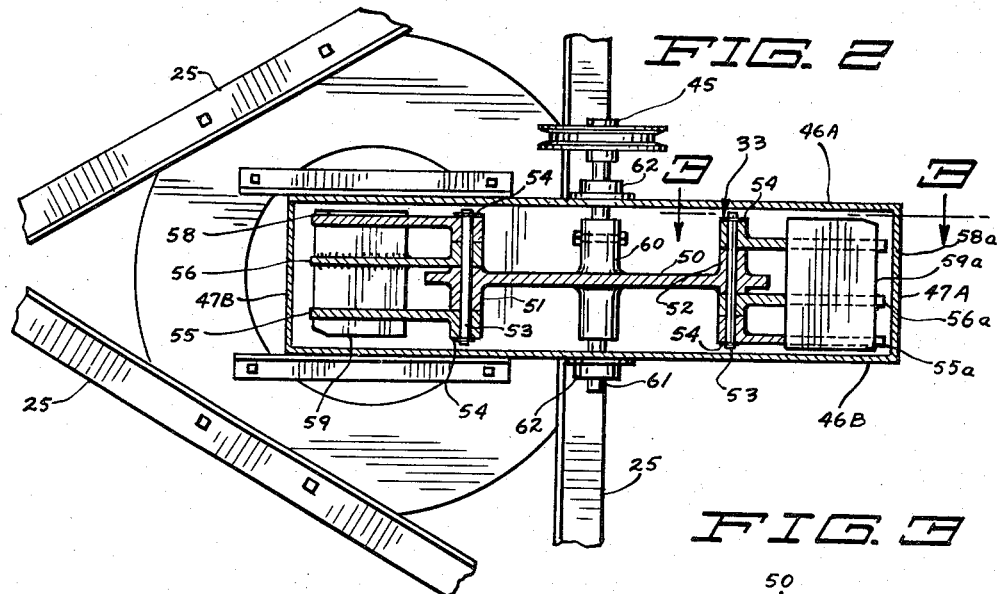
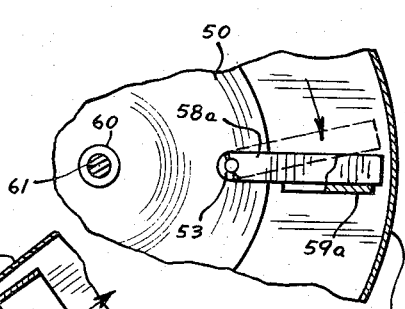
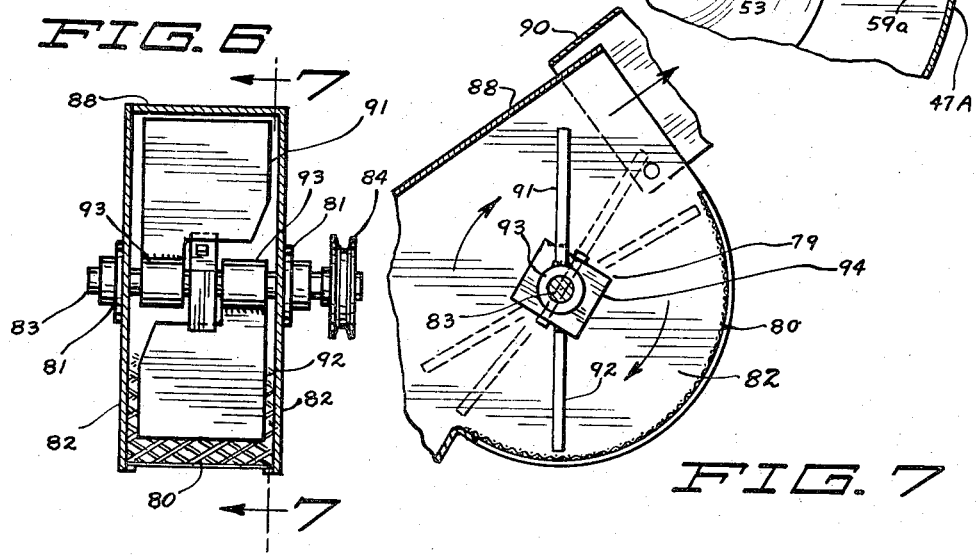
INVENTOR.
FLOYD E. BUSCHBOM
BY
ATTORNEYS

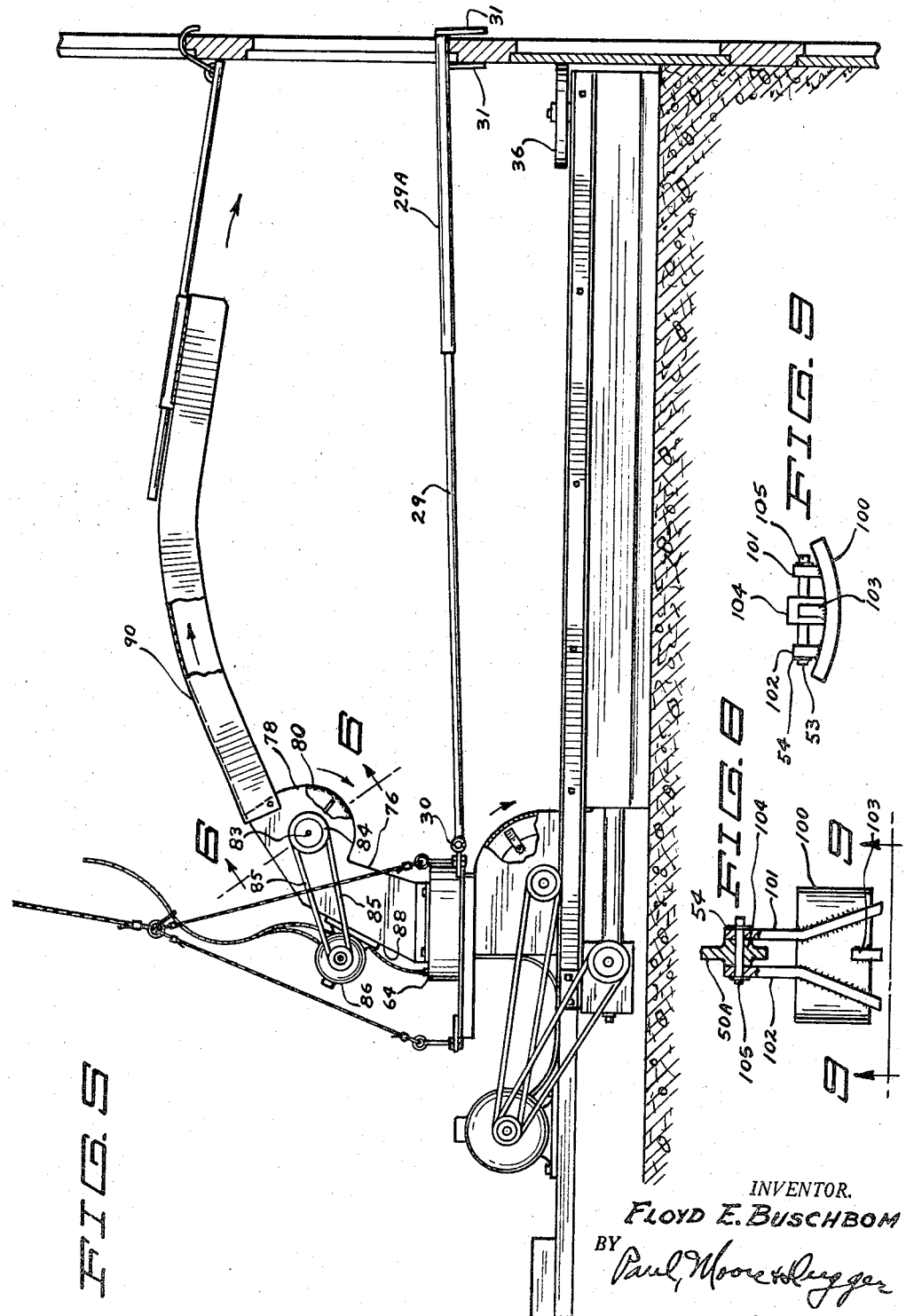

United States Patent Office 2,877,907
Patented Mar. 17, 1959

2,877,907

APPARATUS FOR UNLOADING SILOS

Floyd E. Buschbom, Albert Lea, Minn., assignor to Van Dale, Inc., a corporation of Minnesota Application August 30, 1954, Serial No. 452,862

18 Claims. (Cl. 214—17)

This invention relates to new and useful improvements in apparatus for unloading silos and more particularly to new and useful improvements in solo unloaders of the type disclosed in my co-pending application, Serial No. 389,080, filed October 29, 1953, now Patent No. 2,794,560, of which this application is a continuation-in-part.

More specifically, this invention relates to new and useful improvements in apparatus adapted to be positioned substantially at the center of a silo, or adjacent thereto and for impelling ensilage throughout a distance at least equivalent to the radius of the silo and radially therefrom.

Broadly speaking, the invention comprises a unique impeller positioned at or adjacent the center of a silo in cooperation with a unique guide means whereby ensilage may be impelled or pitched from the center of the silo in an arc encompassing the radius of the silo and for ejection through the conventional doors positioned in a silo wall. A modified form of this invention utilizes two of my unique impellers, one, or a main impeller, for elevating the ensilage at or adjacent the center of the silo, and initiating its ejection, and a second, or booster impeller, for supplying additional momentum or "boost" to the ensilage for ejecting it from the silo.

It is therefore an object of my invention to provide in a silo unloader a new and useful ensilage ejection structure adapted to receive ensilage gathered from the surface of the ensilage positioned in the silo and for elevating and ejecting such ensilage radially from the silo.

Still a further object of my invention resides in the provision of my unique impeller in cooperation with my guide means for directing the ensilage from the impeller to the exterior of the silo.

Still another object of the invention resides in the unique guide means which I have provided for guiding the ensilage from the ensilage and the support means therefor.

Still a further object of this invention resides in the utilization of a first impeller for elevating the ensilage and a second or booster impeller for adding momentum to the travel of the ensilage as it is ejected from the silo.

Still other and further objects of this invention reside in the structural details of my unique guide means in cooperation with my impeller for directing ensilage to the apertures in the silo wall and in the structure preventing rotation of the guide means as the ensilage collection means rotates over the surface of the ensilage; in the structural features which permit reciprocal adjustability of my center impeller with reference to the wall of the silo; and in the unique structural details of my booster mechanism.

Other and further objects of the invention are inherent and apparent in the apparatus as described, illustrated and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings, in which corresponding numerals refer to the same parts and in which:

Figure 1 is an elevational view, partly in section, of my invention installed in position to deliver ensilage from a silo;

Figure 2 is a fragmentary horizontal sectional view taken along the line and in the direction of the arrows 2—2 of Figure 1;

Figure 3 is a fragmentary vertical sectional view taken along the line and in the direction of the arrows 3—3 of Figure 2;

Figure 4 is a horizontal sectional view taken along the line and in the direction of the arrows 4—4 of Figure 1;

Figure 5 is a view similar to Figure 1, but showing a modified form of my invention;

Figure 6 is a sectional view along a line and in the direction of the arrows 6—6 of Figure 5;

Figure 7 is a vertical sectional view taken along the line and in the direction of the arrows 7—7 of Figure 6;

Figure 8 is an elevational view of a modified form of impeller blade of my invention; and Figure 9 is a view taken along the line and in the direction of the arrows 9—9 of Figure 8.

The silo in which my invention is adapted to be utilized is of the conventional upright generally cylindrical construction well known in the art, and is provided with a wall 11 having a plurality of removable doors 12 cooperating with a plurality of vertically positioned rectangular apertures 13 so that as the level of the ensilage descends, individual succeeding doors may be removed for ejection of the ensilage through the successive apertures 13 to the exterior of the silo. The apertures 13 are usually rectangular, extend from the top to the bottom of the silo, and are separated by cross members 32.

The silo unloader, generally designated 19, is suspended from the top of the silo by a single cable 21 connected to a suspension ring 22 to which are in turn connected a plurality of cables 23, preferably forming a triangle. Each cable 23 is joined at its other end to a ring bolt 24 connected to a plate 27 fixed at the juncture of two of the supporting angle members 25. As in my previous application, the suspension of the unloader by the single center cable 21 allows free radial movement of the unloader in the silo and also facilitates the elevation and let-down of the unloader. The triangular suspension provided by the cables 23 promotes a leveling of the unloader in the silo and consequent efficient operation. However, other supporting or suspension means may be used as desired.

The unloader 19 comprises a gathering or collecting arm means 20 usually comprising a rotary auger, and an elevating or delivery means 26 positioned at or adjacent the center of the unloader, and a discharge chute 28.

As will be seen with reference to Figure 1, the main body portion of the unloader and chute 28 are kept from turning by a torque or stabilizing arm or rod 29 pivotally connected at 30 to the frame formed by members 25 and having its exterior end slidably mounted in a sleeve 29A having a pair of parallel downwardly depending flanges or lugs 31 adapted to be seated over one of cross bars 32 positioned between apertures 13 in the wall 11 of the silo.

The collecting means 20 comprises a frame 34 usually of angle iron members upon which is positioned a wall engaging wheel 36 for limiting the engagement of the unloader with the wall 11. A counterweight 38 is provided at one end of the frame for balancing the weight of the collecting means.

As explained with reference to my previous application, the ensilage mechanism has an extension greater than the radius of the silo with which it is to be used, and because of pendant support from the top of the silo by the suspension cable 21, the chute 28 and stabilizing rod 29 will reciprocate as the center of the intake to the discharge chute of my unloader moves about the center of the ensilage in the silo. Since the collecting arm means 20 provides no part of this invention per se and has been adequately explained with reference to my previous application, to which reference is made, it will not be described in detail here. It suffices to say that the collecting arm means is driven for collection through a reduction gearing 40 in turn driven by a V-belt 41, driven by motor 42, and that means is provided for rotating it over the surface of the ensilage.

Motor 42 is suitably mounted upon frame 34 by bolts or other means. The pulley 43 of motor 42 is a double sheave and on one sheave is the V-belt 41 and on the other sheave is the V-belt 44 leading to a pulley 45 for driving the mechanical impeller or delivery motor 33 of the ensilage delivery means generally designated 26. Impeller 33 is positioned within a scroll 48 having an open bottom at 49 for the reception of the ensilage. Scroll 48 provides a confine roughly in the shape of a cylindrical section having vertical plane surfaces 46A and 46B joined by arcuate surfaces 47A and 47B and a tangential outlet at 47C, as is shown best with reference to Figure 1.

The frame 34 for collecting arm means 20 is fixedly secured and supported from the exterior of the scroll 48 as shown in Figure 1.

Disposed within the scroll 48 is the rotary impeller 33 (shown best in Figure 2) comprising a central supporting means 50, comprising a circular disc as shown in Figure 3. However, it is to be understood that a plurality of radial arms or other blade support may take the place of the circular disc in some instances. Placed around the periphery of the circular disc and usually alternated in the direction of their extension is a plurality of bearings, usually four in number, illustrated by bearings 51 and 52. Bearing 52 has its extension upwardly with reference to Figure 2, and bearing 51 has its extension downwardly with reference to that figure. Bearing 51 supports a pivot shaft 53 having split ring or other keepers 54 at the ends thereof for retaining the tines 55, 56 and 58 of impeller blade 59 thereon. The impeller blade is a flat member as shown in Figure 2, beveled at its exterior corners and secured to the center tine 56 by welding or otherwise. It is not secured to the end or side tines 55 and 58. Each of the tines 55, 56 and 58 are pivotable about the shaft 53 and extend a slight distance beyond the outer edge of blade 59.

It will be seen that the tine 56 is secured to blade 59 in a position upwardly offset with reference to its median line as shown in Figure 2.

Bearing 52 supports a pivot shaft 53 likewise having split ring or other keepers 54 for retaining tines 55A, 56A and 58A (similar to tines 55, 56 and 58) of impeller blade 59A thereon. Blade 59A is similar to blade 59 but secured to a tine 56A which is offset downwardly with reference to the median line of blade 59A. Tine 55A is likewise displaced or offset downwardly with reference to the median line of blade 59A. As will be noted with reference to Figure 2, the ends of the tines 55A, 56A and 58A also extend a slight distance beyond the end of a blade 59.

The disc 50 is secured to bearing 60 which is fixed for rotation to shaft 61 journalled in pillow blocks 62 and to one end of which is fixed the pulley 45 for rotation thereof.

As will be apparent from Figures 1 and 4, a support housing 64 is provided which cooperates with and remains stationary as the scroll 48 is rotated for the gathering of the ensilage.

This housing is shown in detail in my aforesaid copending application. The housing 64, as shown best with reference to Figure 4, is supported upon my three triangular braces 32, and in turn supports the delivery means 26 and collecting arm means 20 for rotation over the surface of the ensilage with respect thereto.

The support housing 64 comprises supporting and contact ring structure whereby chute 28 may remain stationary and delivery means 26 rotated with respect thereto, yet supported thereby.

Positioned on top of the support housing 64 and secured thereto by bolts are a pair of angle flanges 66 secured by any suitable means to the discharge chute 28 as shown in Figure 1. Discharge chute 28 is provided with an integral top 69 forming, in cooperation with sides 68, a vertical cross sectional shape in the form of a downwardly directed U. The chute 28 is formed from sheet metal or of other constructional materials.

While the discharge chute 28 may be carried through one of the apertures 13 or substantially adjacent thereto, I have not found it necessary to do this and have been able to space it substantially inward from the wall 11, thus reducing the extension, the necessary weight and improving the discharge of the ensilage through the apertures 13.

Positioned upon the top 69 of my chute and adjacent the end 70 thereof, is a sleeve 71 in which reciprocates the bar 72 having a hook 73 secured to an eye 74 welded or otherwise securely affixed to the bar 72. The hook 73 is positioned over one of the cross braces 32 and serves to support the chute 28 in the position shown in Figure 1.

Referring now specifically to Figures 5–7, there is shown a modified form of my invention in which there is provided a second or booster impeller. Thus, a chute section 76 is provided, secured to a housing 64 as previously explained with reference to chute 28. Thus, section 76 may be of U or other cross section and may be opened at its downward side or may form a closed square or other shaped tube. The chute section 76 is provided with a housing 78 in which is positioned a second impeller 79. The side members of the housing 78 generally take the shape of a circle having a chord edge on the upper side thereof. While I have found that the housing may be completely enclosed, I prefer to provide an arcuate screen 80 throughout a portion thereof as shown in Figure 7. The impeller 79 is supported by pillow blocks 81 upon the side walls 82 of the housing 78. Blocks 81 carry shaft 83, to one end of which is attached a pulley 84, driven by a V-belt 85, in turn driven by a second motor 86 positioned upon the wall 88 of the housing 76 and secured thereto by suitable means. Pivotally secured to the side walls 82 of the housing 78 is a chute 90 similar to chute 28 previously explained but having somewhat different arcuate contour.

As shown in Figures 5–8, the impeller 79 is somewhat different than the impeller 33 but an impeller similar to impeller 33 may be used if desired. Impeller 79 comprises a pair of blades 91 and 92 having integral sleeves 93 journalled on shaft 83. A square block 94 pinned or otherwise secured for rotation with shaft 83 serves as a drive member for rotating the blades 91 and 92 as shown with reference to Figure 7. Thus, it will be seen that blades 91 and 92 are positioned on the shaft 83 for limited movement from the full to the dotted line position of Figure 7. As block 94 is rotated in the direction of the arrow of Figure 7 the blades 91 and 92 will assume the full line position shown therein.

Referring now to Figures 8 and 9, there is shown a modified form of blade 100 having a curvature as shown best in Figure 9. Blade 100 is provided with supporting members 101 and 102 and a stiffening member 103. Members 101 and 102 are sleeved onto pin 103 for rotation thereon which is positioned in an aperture in a symmetrical boss 104 in disc 50A similar to disc 50.

In operation, ensilage is collected by the gathering arm 20 as it rotates over the surface of the silo and delivered to the impeller 33 from whence, in the modification shown in Figures 1 and 2, it is forceably impelled in a trajectory through chute 28, and in a stream through aperture 13. Since the center of the intake chute is eccentric with respect to the center of the silo, the chute 28 and torque arm 29 will reciprocate as the collecting arm 20 rotates around the surface of the ensilage.

In the modification shown in Figures 5–7, the ensilage will be engaged by blades 91 and 92 and further assisted or boosted throughout the chute to emerge to the apertures 13.

As will be appreciated, the projection of my tines 55, 56 and 59 or of members 101, 102 and 103 beyond the ends of the impeller blades provides a "chewing" action of the ensilage and thence assist in the delivery of frozen ensilage or in starting the impeller from rest. Further, the provision of pivoted blades for my impellers insures that the blades will not become frozen in ensilage and make the apparatus fail to start.

As many widely differing embodiments of this invention may be made without departing from the spirit and scope thereof, it is to be understood that I do not limit myself by the specific embodiments disclosed herein.

What I claim is:

1. In a silo unloader or the like having means for engaging the surface of ensilage in a silo and for conveying ensilage toward the center of the silo, a substantially centrally positioned impeller for receiving ensilage and for upwardly and outwardly impelling said ensilage, an extending chute means positioned for cooperation with said impeller for guiding said ensilage upwardly and outwardly through the wall of the silo, and said chute means terminating short of and in spaced relation to said silo wall and means supporting said chute means in said spaced relation.

2. The apparatus of claim 1 further characterized in that said chute means comprises a three sided arcuate chute having an open side directed generally toward the surface of the ensilage in the silo.

3. The apparatus of claim 1 further characterized in that means is provided whereby said chute means may be reciprocated radially with respect to said silo wall.

4. A silo unloader or the like adapted to be positioned on the surface of the ensilage within a silo comprising in combination, a means for feeding ensilage toward the center of a silo, a first impeller means positioned in cooperation therewith for elevating and discharging said ensilage laterally from the silo, an arcuate guide means extending from said impeller in the direction of the wall of the silo for confining said ensilage as it is discharged, and a second impeller means positioned in said guide means.

5. The apparatus of claim 4 further characterized in that said second impeller comprises a rotary paddle impeller.

6. The apparatus of claim 4 further characterized by a closed chute leading from said first impeller and having a peripheral reticulated portion and guide means leading from said second impeller in the direction of said silo wall.

7. The apparatus of claim 4 further characterized in that said first impeller comprises a plurality of rotary paddle means rotatable about a horizontal axis, said paddle means having an edge surface substantially parallel to the axis of rotation and spaced tine means extending therebeyond.

8. A silo unloader comprising in combination means for collecting and delivering ensilage substantially to the center of a silo, impeller means adapted to receive said ensilage and for expelling said ensilage, guide means directing the movement of said ensilage from said impeller and second impeller means positioned in cooperation with said guide means to receive ensilage for adding additional impetus to said ensilage.

9. A silo unloader comprising in combination means for collecting and delivering ensilage substantially to the center of a silo, impeller means adapted to receive said ensilage substantially tangentially and for tangentially expelling said ensilage, guide means directing the movement of said ensilage from said impeller and second impeller means positioned in cooperation with said guide means to receive ensilage and having a tangential entrance and a tangential exit into said guide means for adding additional impetus to said ensilage.

10. A silo unloader adapted to be positioned on the surface of the ensilage within a silo comprising in combination, a means for feeding ensilage from the center of a silo, a rotary impeller means comprising a plurality of blades rotatable about a horizontal axis for elevating and discharging said ensilage laterally from the silo, an arcuate guide means extending from said impeller in the direction of the wall of the silo for confining said ensilage as it is discharged, and said blades each having a face convex in the direction of rotation.

11. The apparatus of claim 4 further characterized in that said first and second impeller means each comprise rotary impellers rotating in the same direction.

12. The apparatus of claim 11 further characterized in that said first and second impeller means each comprise a plurality of paddle means.

13. In a silo unloader or the like having a rotary impeller and a discharge chute, said impeller positioned to discharge material through said chute, the improvement of a rotary booster means mounted in said chute for supplying additional momentum to said material.

14. In a silo unloader or the like having means for engaging the surface of ensilage in a silo and for conveying ensilage toward the center of the silo and to an impeller, said means being journalled for rotation in a horizontal direction about its interior end, a centrally positioned impeller for receiving ensilage from said ensilage engaging means and for upwardly and outwardly impelling said ensilage, said impeller being journalled for rotation in a horizontal direction with said ensilage engaging means, rotatively stationary means for receiving the ensilage and for discharging the same from the silo, torque arm means for engaging the frame of an aperture in the silo and connected to said rotatively stationary means for preventing the rotation thereof, said rotatively stationary means including an extending chute means positioned for cooperation with said impeller for guiding said ensilage upwardly and outwardly through the wall of the silo, said chute means terminating substantially short of and in spaced relation to said silo wall, means supporting said chute means in said spaced relation, means supporting said torque arm means from said aperture frame and permitting reciprocation of said impeller and ensilage engaging means and said rotatively stationary means including said chute means toward and away from said aperture, and said torque arm means and said chute means extending in the same radial direction.

15. In a silo unloader or the like having torque arm means for engaging the wall of the silo for preventing rotary movement of a discharge chute, the improvement of said discharge chute being positioned substantially over said torque arm means and supported with its discharge end terminating in spaced relation to the silo wall.

16. The apparatus of claim 14 further characterized by means whereby said torque arm means may expand and contract within the silo closure.

17. The apparatus of claim 15 further characterized in that said torque arm means comprises sleeve and cooperating rod means extending between said silo unloader and said silo wall.

18. In a silo unloader adapted to be positioned on the surface of the ensilage within a silo comprising in combination, means for feeding ensilage toward the center of a silo, impeller means comprising a plurality of rotary paddle means rotatable about a horizontal axis, said paddle means each having an edge surface substantially parallel to the axis of rotation and spaced tine means extending therebeyond for elevating and discharging said ensilage laterally from the silo, and guide means extending from said impeller in the direction of the wall of the silo for confining said ensilage as it is discharged.

References Cited in the file of this patent

UNITED STATES PATENTS

| | | |
|---|---|---|
| 1,020,307 | Parker | Mar. 12, 1912 |
| 1,556,718 | Roming | Oct. 13, 1925 |
| 2,136,214 | Keith | Nov. 8, 1938 |
| 2,445,056 | Cordis | July 13, 1948 |
| 2,595,333 | Clapp | May 6, 1952 |
| 2,615,594 | Clapp | Oct. 28, 1952 |
| 2,651,438 | Peterson | Sept. 8, 1953 |
| 2,671,696 | McLean | Mar. 9, 1954 |
| 2,677,474 | Long | May 4, 1954 |
| 2,678,241 | Miller | May 11, 1954 |